(12) United States Patent
Lopez-Chaves et al.

(10) Patent No.: US 9,951,869 B2
(45) Date of Patent: Apr. 24, 2018

(54) SEAL FOR BELLED PIPE

(71) Applicant: Trelleborg Pipe Seals Lelystad BV, Lelystad (NL)

(72) Inventors: Bernal Lopez-Chaves, Lelystad (NL); Alan Guzowski, Chula Vista, CA (US)

(73) Assignee: TRELLEBORG PIPE SEALS LELYSTAD BV, Lelystad (NL)

( * ) Notice: Subject to any disclaimer, the term of this patent is extended or adjusted under 35 U.S.C. 154(b) by 184 days.

(21) Appl. No.: 14/614,254

(22) Filed: Feb. 4, 2015

(65) Prior Publication Data

US 2016/0223109 A1  Aug. 4, 2016

(51) Int. Cl.
F16J 15/10 (2006.01)
F16J 15/02 (2006.01)
F16L 21/03 (2006.01)

(52) U.S. Cl.
CPC ........... *F16J 15/022* (2013.01); *F16J 15/025* (2013.01); *F16L 21/03* (2013.01)

(58) Field of Classification Search
CPC .......... F16J 15/02; F16J 15/022; F16J 15/025; F16L 37/00; F16L 37/02; F16L 37/092; F16L 37/0925
See application file for complete search history.

(56) References Cited

U.S. PATENT DOCUMENTS

| | | | |
|---|---|---|---|
| 1,924,020 A | 8/1933 | Bihet | |
| 2,730,116 A | 1/1956 | Richard | |
| 2,967,067 A | 1/1961 | Singer | |
| 3,211,472 A | 10/1965 | Rickard | |
| 3,222,091 A | 12/1965 | Marshall | |
| 3,480,300 A | 11/1969 | Jeffrey et al. | |
| 3,698,744 A | 10/1972 | Bevington | |
| 3,884,510 A | 5/1975 | Bram | |
| 4,120,521 A | 10/1978 | Parmann | |
| 4,127,290 A | 11/1978 | Mutschlechner | |
| 4,310,184 A | 1/1982 | Campbell | |
| 4,552,385 A | 11/1985 | Peting | |
| 4,648,633 A | 3/1987 | Bergmann | |
| 4,818,209 A | 4/1989 | Petersson | |
| 5,139,290 A | 8/1992 | Shafer | |
| 5,197,768 A | 3/1993 | Conner | |

(Continued)

FOREIGN PATENT DOCUMENTS

| | | |
|---|---|---|
| DE | 2628727 A1 | 1/1978 |
| DE | 3405988 A1 | 8/1985 |

(Continued)

OTHER PUBLICATIONS

International Search Report and Written Opinion of the International Searching Authority dated May 15, 2014 for International application No. PCT/US2014/012601.

(Continued)

*Primary Examiner* — Gilbert Y Lee
(74) *Attorney, Agent, or Firm* — Knobbe Martens Olson & Bear, LLP

(57) ABSTRACT

A sealing ring for connecting a belled end of a female pipe to a spigot end of a male pipe is disclosed. The sealing ring includes a sealing portion joined to a restraining portion. Preferably the sealing portion is made of an elastomeric material and the reinforcing portion is made of a polymer and does not include a metal reinforcement.

25 Claims, 14 Drawing Sheets

(56) References Cited

U.S. PATENT DOCUMENTS

| | | |
|---|---|---|
| 6,113,159 A | 9/2000 | Corbett, Jr. |
| 6,142,484 A | 11/2000 | Valls, Jr. |
| 6,145,895 A | 11/2000 | Patel et al. |
| 6,179,346 B1 | 1/2001 | Robson |
| 6,533,332 B2 | 3/2003 | Vitel et al. |
| 6,945,570 B2 | 9/2005 | Jones |
| 7,125,054 B2 | 10/2006 | Jones |
| 7,158,034 B2 * | 1/2007 | Corbett, Jr. ............ F16J 15/064 277/314 |
| 7,284,310 B2 | 10/2007 | Jones et al. |
| 2002/0163195 A1 | 11/2002 | Vitel et al. |
| 2005/0046189 A1 | 3/2005 | Corbett et al. |
| 2005/0275217 A1 | 12/2005 | Walworth |
| 2009/0060635 A1 | 3/2009 | Jones |
| 2009/0200705 A1 | 8/2009 | Mora |
| 2010/0025982 A1 | 2/2010 | Jamison |
| 2010/0059940 A1 * | 3/2010 | Monteil ............ F16L 21/03 277/314 |
| 2011/0254266 A1 | 10/2011 | Guzowski |
| 2012/0049409 A1 | 3/2012 | Guzowski |

FOREIGN PATENT DOCUMENTS

| | | |
|---|---|---|
| EP | 1881251 A2 | 1/2008 |
| FR | 2907877 A1 | 5/2008 |
| FR | 2939177 A1 | 6/2010 |
| WO | WO8203440 | 10/1982 |

OTHER PUBLICATIONS

Kuro Brochure; PVC Cable Protection Pipe; 2 pages; dated Sep. 2013; publication available on the Internet.

* cited by examiner

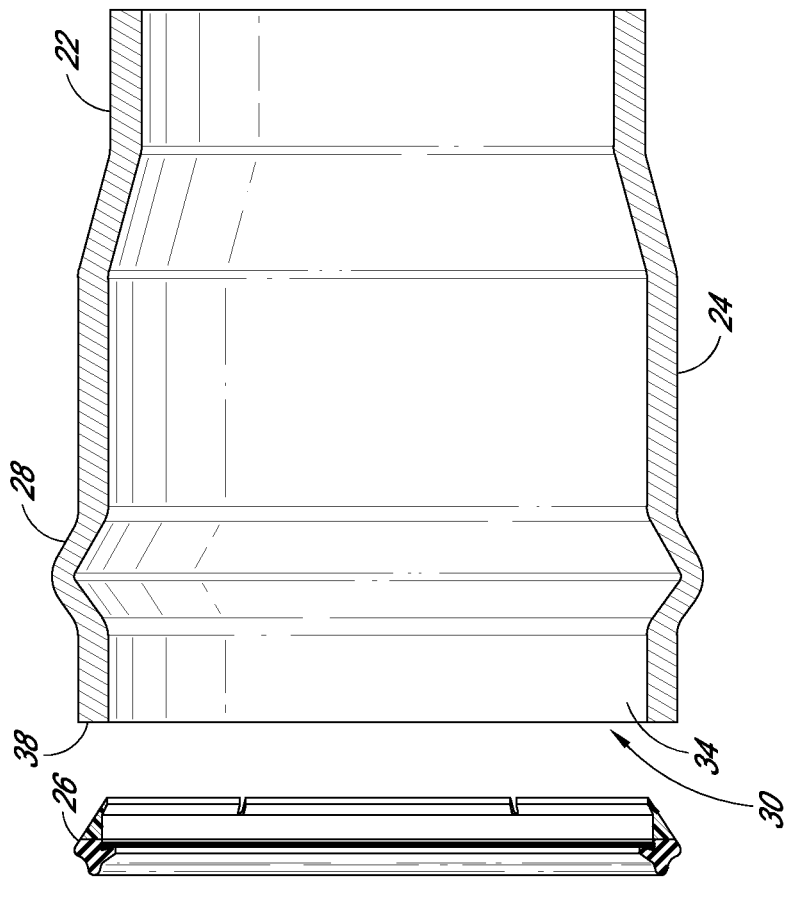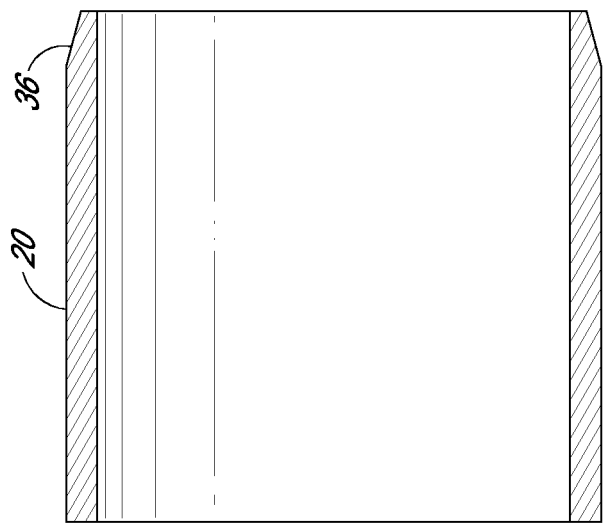
FIG. 3

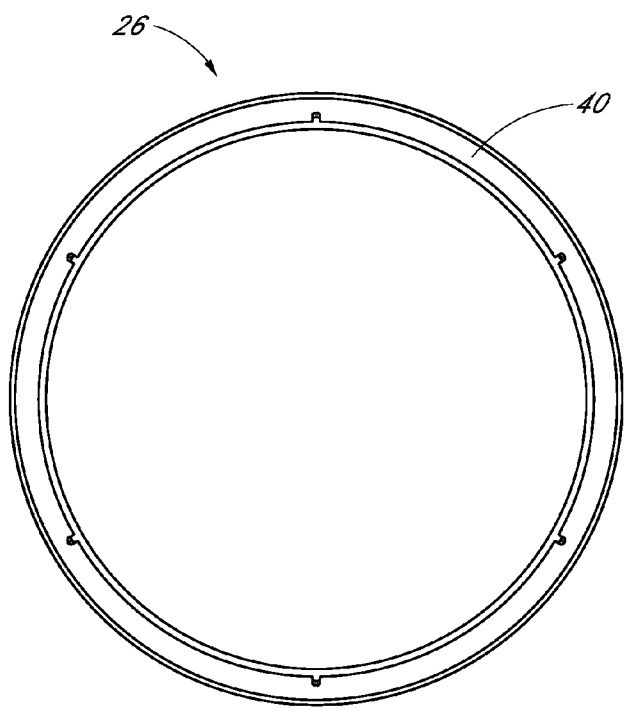
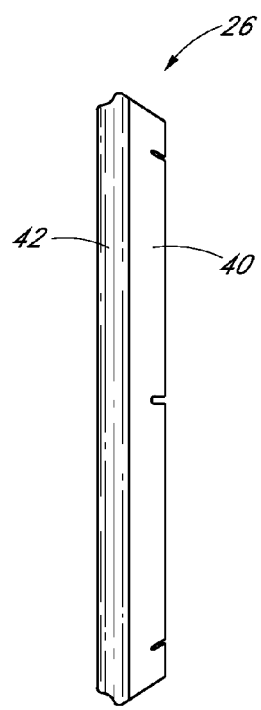
FIG. 7  FIG. 8
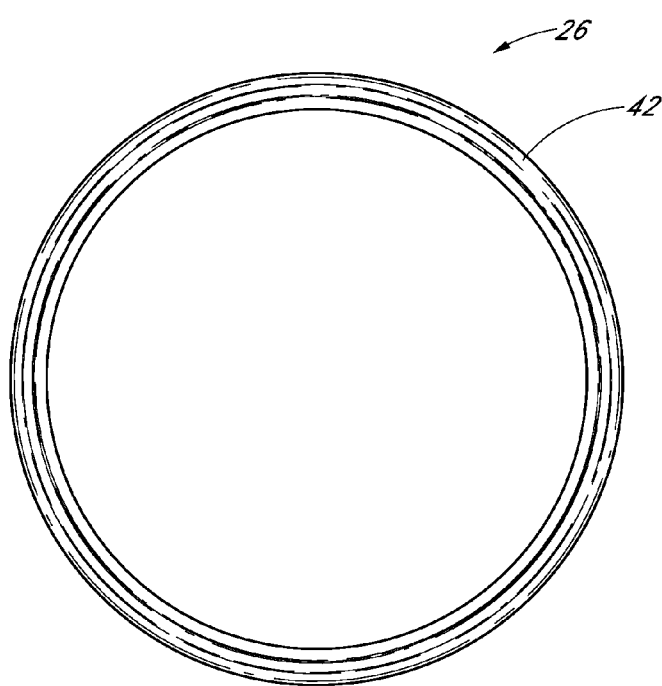
FIG. 9

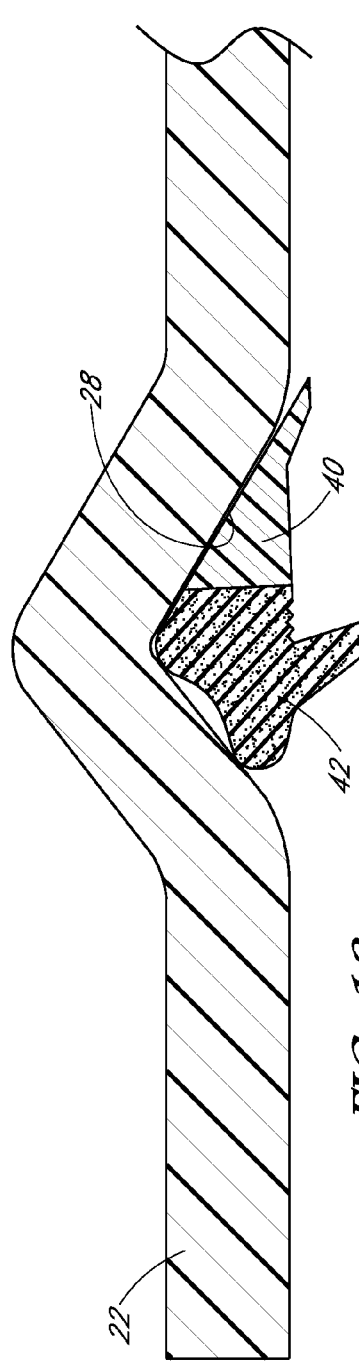
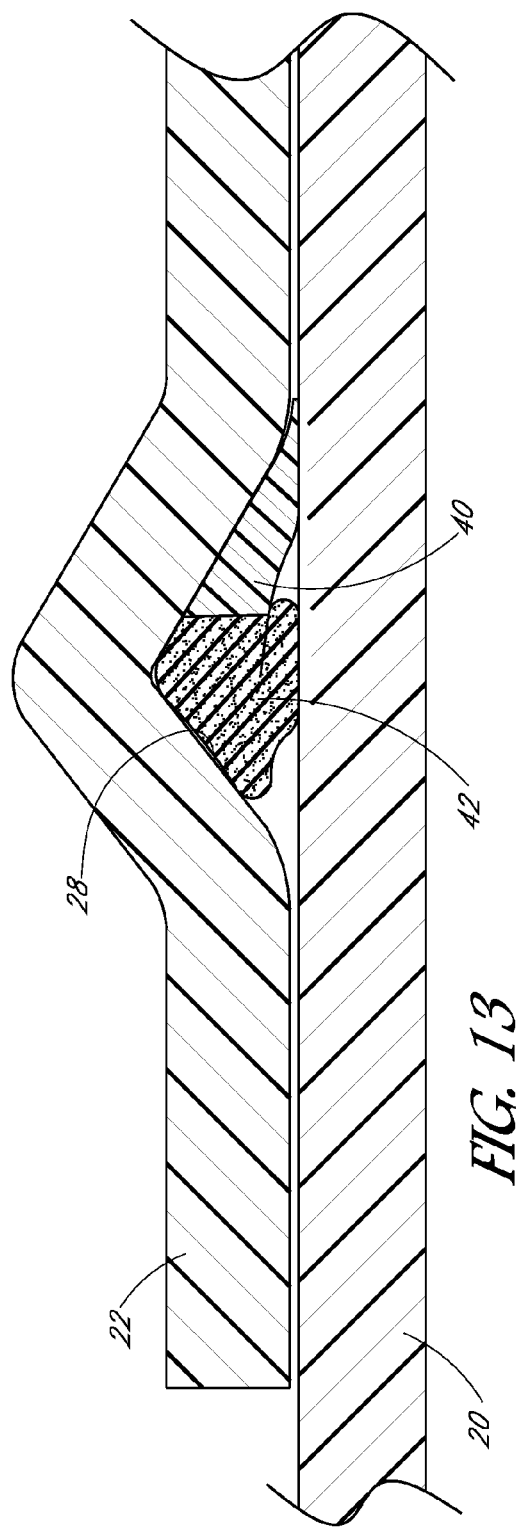

SEAL FOR BELLED PIPE

BACKGROUND OF THE INVENTION

Field of the Invention

The present invention relates to the joining of pipes and specifically to a seal for sealing a space connecting a belled end of a length of pipe to the spigot end of a length of pipe or fitting and methods for manufacturing the same. The seal is an improved seal that includes two different materials which can be used in a Rieber type belling process to interconnect the belled and spigot pipes. More specifically, the present invention discloses an improved seal exhibiting an improved cross sectional profile established between a first material such as rubber or other material and a second material such as a plastic polymer. The forming process further establishes high bond line strength between the first and second materials.

Description of the Related Art

Pipelines for conveying fluids can be made from a number of different materials, including plastic materials, such as polyethylene or polyvinyl chloride (PVC), and metals, such as steel, brass and aluminum. Pipes formed from plastic materials are used in a variety of industries. Each length of such pipe typically has a belled female end and a spigot male end. In forming a joint between sections of pipe, the spigot or male pipe end is inserted within the female or socket pipe end. The joints between sections of pipe are sealed, typically with a gasket. For example, an annular, elastomeric ring or gasket is typically seated within a groove formed in the belled end of the pipe. As the spigot is inserted within the socket, the gasket provides the major seal capacity for the joint.

Prior art examples of reinforced rubber seals are interposed between interconnecting end to end connected sections of pipe fittings and the like. For example, a system was developed for connecting sections of PVC pipe and for connecting fittings to PVC pipe. These PVC pipe systems have relied mainly on the "Rieber Joint," which was developed in the early 1970's by Rieber & Son of Bergen, Norway, to seal the connections (see for example U.S. Pat. No. 4,368,894 to Parmann). The Rieber seal was developed in order to address certain problems, including preventing the dislodgement of a homogeneous and non-reinforced elastomeric seal from an associated inner annular bell groove during insertion into the bell of an engaging spigot end of a succeeding pipe section.

The Rieber joint has an elastomeric gasket inserted into a groove on the inside of the belled end of a piece of the PVC pipe as the female end is being formed. Conventional Rieber seals used in a Rieber joint include a steel wire or flattened band which is either externally or internally bonded. The steel wire or band is disposed proximate to the exterior perimeter of the annular extending elastomer body and is locked into place within the bell groove due to pre-stressing of the elastomer against the inner annular wall of the pipe. The seal prevents the penetration of soil and other foreign particles into a sealing zone established between the outer walls of the seal and the internal walls of the bell where the seal is seated. In this fashion, the steel ring operates to hold open the seal for subsequent inter-assembly and during the initial belling process. External elements are then added to restrain the pipe after the joint is assembled.

The seal described above is loaded on an outer surface of a substantially cylindrical forming mandrel. An end portion of a thermoplastic material pipe is in a heated, softened state when it is pushed over the mandrel. The seal is located on the mandrel. Thereby, the female pipe end portion is formed into a socket, in which the seal forms a groove in the socket. An outer surface of the seal molds the female pipe end portion in a belled shape as the female pipe is pushed over the seal. The seal is retained in the groove. After cooling, the pipe and the seal are withdrawn from the mandrel with the seal remaining in the groove formed in the socket end. When jointing the pipe with another pipe the seal is used for sealing the space between the socket end and the spigot end of a pipe introduced into the socket end.

The seal functions as a forming element during fabrication. Once assembled between interconnected pipes, the seal functions as a sealing element. To be able to comply with its purpose as a forming element the seal needs to resist forces exerted on the seal during the forming operation. To this end, the seal includes a rigid metal ring. To comply with the sealing function, the seal has elastomeric features. In order to achieve these requirements, the Rieber seal includes a first annular sealing portion consisting of elastically yieldable sealing material with an embedded annular portion for reinforcing the seal. For the Rieber seal, the reinforcing portion consists of a steel ring which is enclosed in the elastically yieldable material of the annular sealing portion. In a seal of this kind the elastically yieldable material is utilized not only for providing the sealing function but also as the forming portion of the seal by the fact that the major portion of the external surfaces of the seal, i.e. the surfaces engaging the forming mandrel as well as the surfaces engaged by the softened thermoplastic material during the forming operation, are the elastically yieldable sealing material.

The Rieber Joint has several disadvantages, including the possibility of failure due to the complexity of the combined steel wire or flattened band and seal. Further, the steel wire or flattened band may become exposed to the elements during its lifetime resulting in corrosion of the wire or band. This exposure of the wire or band can occur if the seal is damaged during installation or pipe assembly. In certain cases, prolonged use results in the outer rubber material locally cracking to expose the wire or band. It is also critical, during the installation process, that the Rieber seal not twist or flip since a displaced or dislocated seal will adversely affect the ultimate sealing capacity of the joint. It is also critical to the success of the pipe joint that the seal be maintained in the proper position in its respective groove during installation and use. For large diameter pipes, the insertion force needed to install the male spigot end within the mating socket end and seal requires a high insertion force which could, on some occasions, cause the gasket to be distorted or displaced.

Thus, a need exists for a seal for bell and spigot pipes and fittings that provides ease of assembly during the forming process without the risk of corrosion while still maintaining the integrity of the seal. A further drawback of the seal of the prior art type is that the steel rings constituting the reinforcing portions of the seal are relatively expensive. The object of the present invention is to provide an improved seal in the respects discussed above.

SUMMARY OF THE INVENTION

An aspect of the present invention involves an improved Rieber type sealing ring having a homogeneous annular sealing portion that includes an elastically yieldable material and a concave curved region disposed so as to contact an inner surface of a female pipe section when a male pipe section is installed therein. The seal further has a homogenous annular reinforcing portion joined to the homogeneous annular sealing portion and is a thermoplastic.

Another aspect is an annular seal for installation within a receiving spigot end of a first pipe section and within which an inserting end of a second pipe section is subsequently installed. The seal includes a body having an elastomeric portion joined to a polymer portion. The elastomeric portion has a forward region, an outer region connected by a concave curved region to the forward region, and a protrusion. The protrusion is coplanar in a vertical direction with the concave curved region.

Another aspect is a method of installing an improved Rieber seal in a belled pipe. The method includes providing a homogeneous annular sealing portion comprising elastomeric material and a homogenous annular reinforcing portion having a polymeric material joined to the homogeneous annular sealing portion. The homogenous annular sealing portion has a concave curved region disposed so as to contact an inner surface of a female pipe section when a male pipe section is installed therein. The method further includes locating the homogeneous annular sealing portion and the homogenous annular reinforcing portion in the female pipe section.

The systems and methods of the invention have several aspects and features, no single one of which is solely responsible for all of its desirable attributes. Without limiting the scope of the invention as expressed by the claims, its more prominent aspects have been discussed briefly above. Further aspects and features will also be understood from the description below. Additionally, various aspects and features of the system can be practiced apart from each other.

BRIEF DESCRIPTION OF THE DRAWINGS

These and other features, aspects and advantages of the present invention will now be described in connection with preferred embodiments of the invention, in reference to the accompanying drawings. The illustrated embodiments, however, are merely examples and are not intended to limit the invention. The following are brief descriptions of the drawings.

FIG. 3 is an exploded cross-sectional view of the pipe coupling and sealing ring from FIG. 2;

FIG. 7 is an end view of the sealing ring from FIG. 5;

FIG. 8 is a side view of the sealing ring from FIG. 5;

FIG. 9 is an opposite end view to the view in FIG. 7 of the sealing ring from FIG. 5;

FIG. 12 is a cross-section view of the belled end of the female pipe with the sealing ring disposed therein;

FIG. 13 is a cross-section view of the assembled joint from FIG. 2 showing both the spigot end of the male pipe and the belled end of the female pipe with the sealing ring compressed between the outer surface of the spigot and the inner surface of the belled end.

DETAILED DESCRIPTION OF CERTAIN EMBODIMENTS

Figure 1:
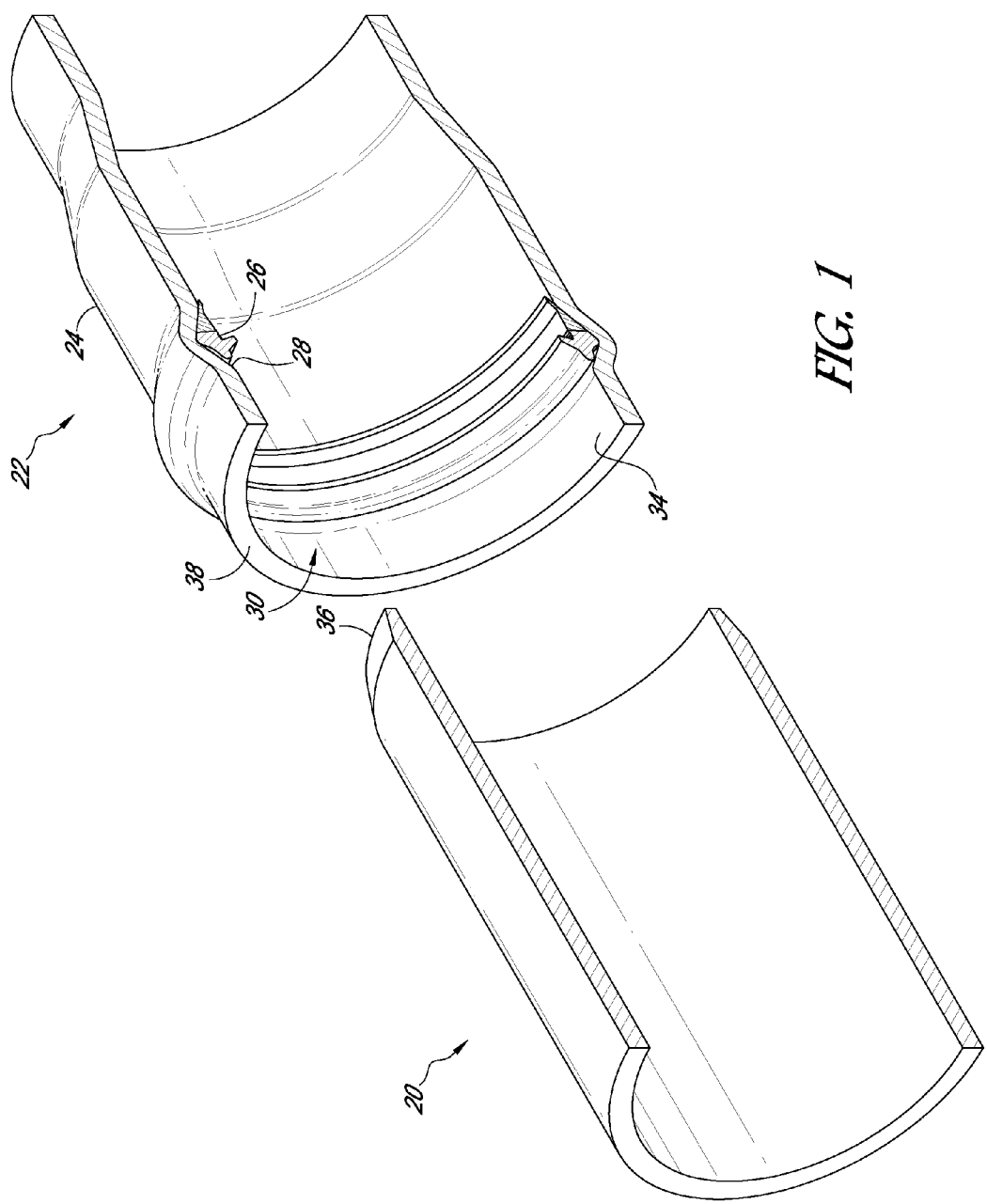
FIG. 1 is a perspective view, broken away, of male and female pipe sections about to form a pipe coupling, the belled end of the female pipe section showing a sealing ring in place within a mating groove provided therein.

Embodiments of the sealing ring include a sealing portion and a reinforcing portion constituted as two portions positioned adjacent to each other in the axial direction of the ring on each side of the connection surface between the portions for dividing the ring into a portion which is inactive from the sealing point of view and active from the forming and locking point of view and a portion which is active from the sealing point of view and is substantially inactive from the forming and locking point of view. The portion which is the reinforcing member is active from the forming and locking point of view is the side of the sealing ring first engaged by the pipe and portion when forming the socket end and having less radial extension than the portion forming the sealing portion and being active from the sealing point of view.

The forming and sealing functions are separated which is advantageous with regard to the function as well as with regard to the costs. Thus, the forming function of the sealing ring is provided by a relatively rigid material facilitating the retaining of the ring on the forming mandrel and making it easier to provide the connection of the side of the sealing ring initially engaged by the thermoplastic pipe when accomplishing the forming operation with the outer surface of the forming mandrel. The risk of pushing the sealing ring in front of the pipe end portion when the pipe end portion is pushed over the sealing ring is obviated. In certain embodiments, the reinforcing member is a relatively cheap plastic material instead of steel reducing the total costs of the ring while obviating the risk of contamination due to corrosion. In certain embodiments of the sealing ring it is possible also to manufacture only the portion of the sealing ring which is active from the sealing point of view from an elastically yieldable material and to manufacture a substantial portion of the sealing ring from a plastic material which is cheap in relation to the costs of the elastically yieldable material. Also this fact provides for a substantial reduction of the costs of the sealing ring.

In certain embodiments the reinforcing portion forms at its side opposite from the connection surface between the reinforcing portion and the sealing portion a wedge-shaped edge portion. The edge portion provides a close engagement between the reinforcing portion and an outer surface portion of the substantially cylindrical forming mandrel.

As a consequence of the sealing ring having a portion of a relatively rigid material positioned in connection with the forming mandrel it is easy to lock the sealing ring with regard to axial displacement on the forming mandrel during the forming operation by providing the reinforcing mandrel of the sealing ring and the outer surface of the forming mandrel with locking means engaging each other.

In order to provide an improved binding between the sealing and reinforcing portions of the sealing ring at the connection surface thereof it is possible to design this surface so that it diverges from the shape of a flat surface. For example it is possible to design the connection surface so that it has a zigzag or V-shaped cross-section and/or so that it is corrugated in the peripheral direction.

Figure 2:
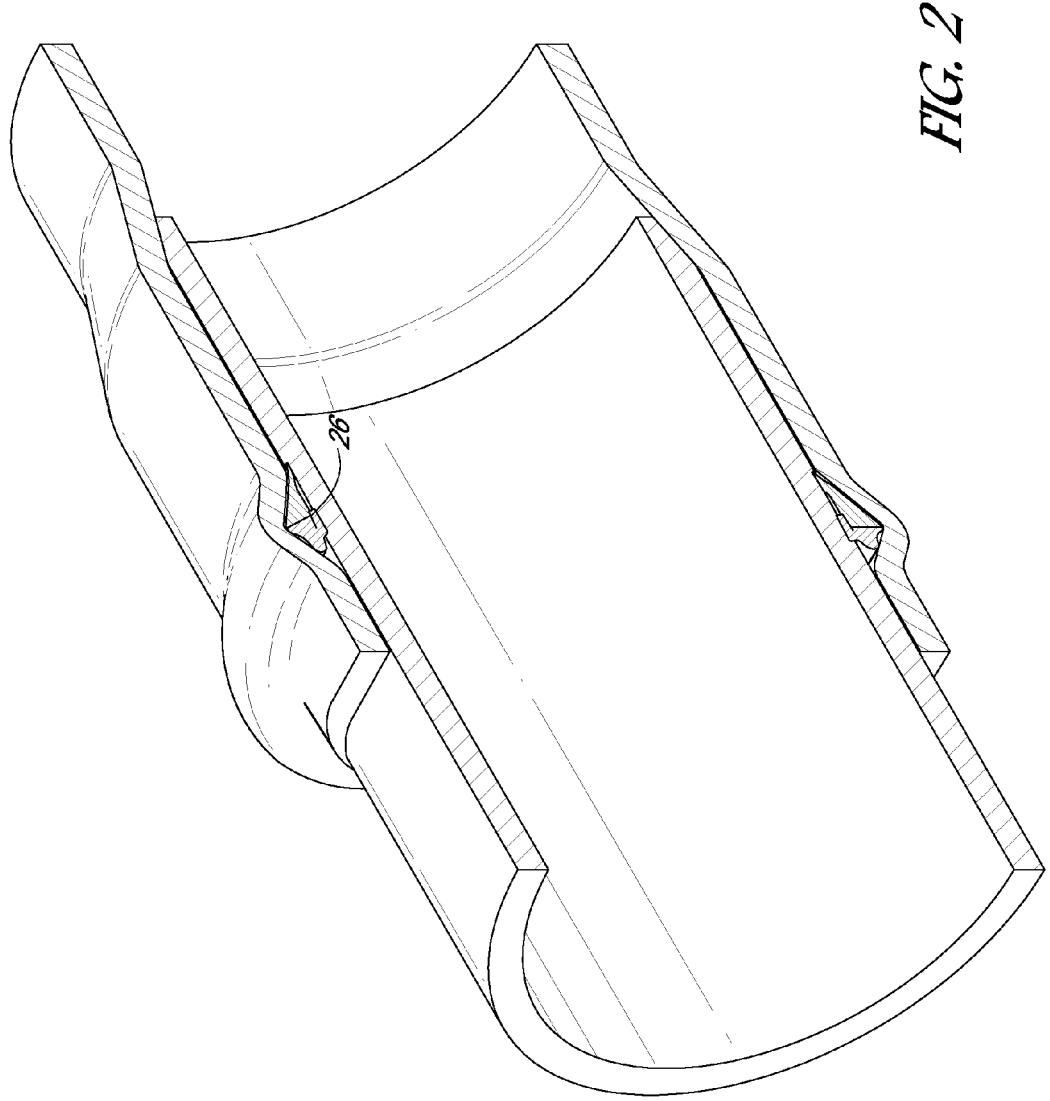
FIG. 2 is a perspective view of a system according to a preferred embodiment of the present invention which seals the pipe coupling formed by the male and female pipe sections from FIG. 1.

FIG. 1 is a perspective view, partly broken away, of male and female pipe sections 20, 22 about to form a pipe coupling, the belled end 24 of the female pipe section 22 showing a sealing ring 26 in place within a mating groove 28 provided therein. FIG. 2 is a perspective view of a system according to a preferred embodiment of the present invention which seals the pipe coupling formed by the male and female pipe sections 20, 22 from FIG. 1.

The system illustrated in FIG. 2 includes a sealing ring 26 or body fabricated for use with the male and female pipes 20, 22 to seal the joint. The groove 28 is preferably formed while sliding the female pipe 22 over a mandrel. The sealing ring 26 is left in the groove 28 formed in the female pipe 22. Of course the sealing ring 26 need not be placed within the groove 28 prior to assembly and instead may be placed within the groove 28 during assembly of the joint.

In certain embodiments, the inner diameter of the lip 38 of the belled end 24 has a smooth finish thereon. A leading portion of the outer diameter of the male pipe 20 has a chamfered surface 36 formed thereon for facilitating passage of the male pipe 20 through the sealing ring 26 and the female pipe 22.

Figure 4:
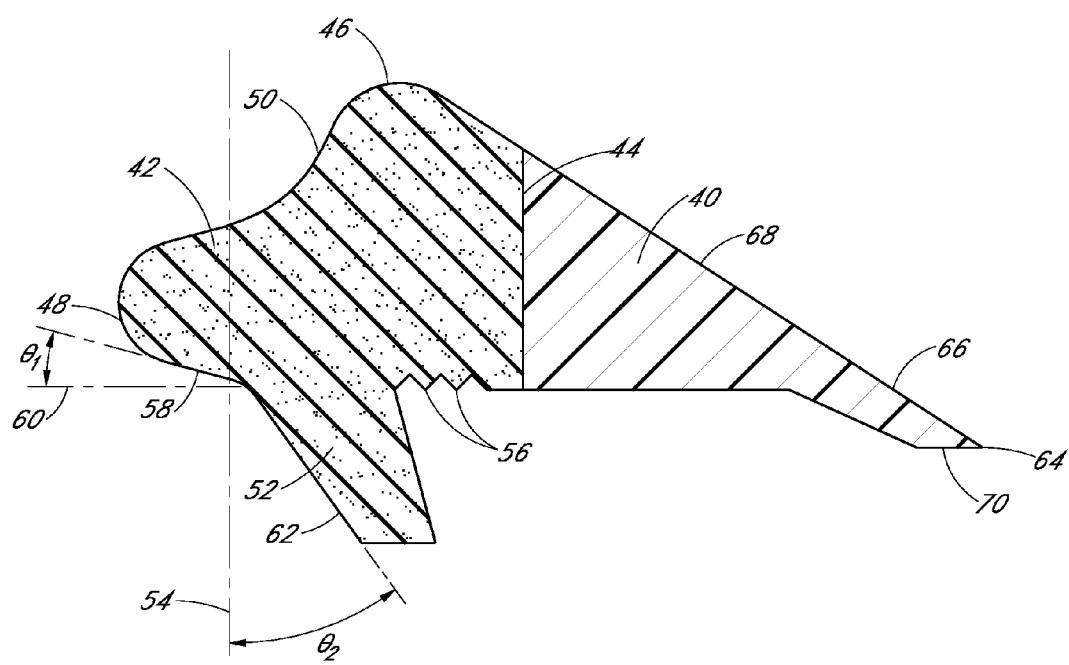
FIG. 4 is a cross-section view of the sealing ring from FIG. 3.
Figure 5:
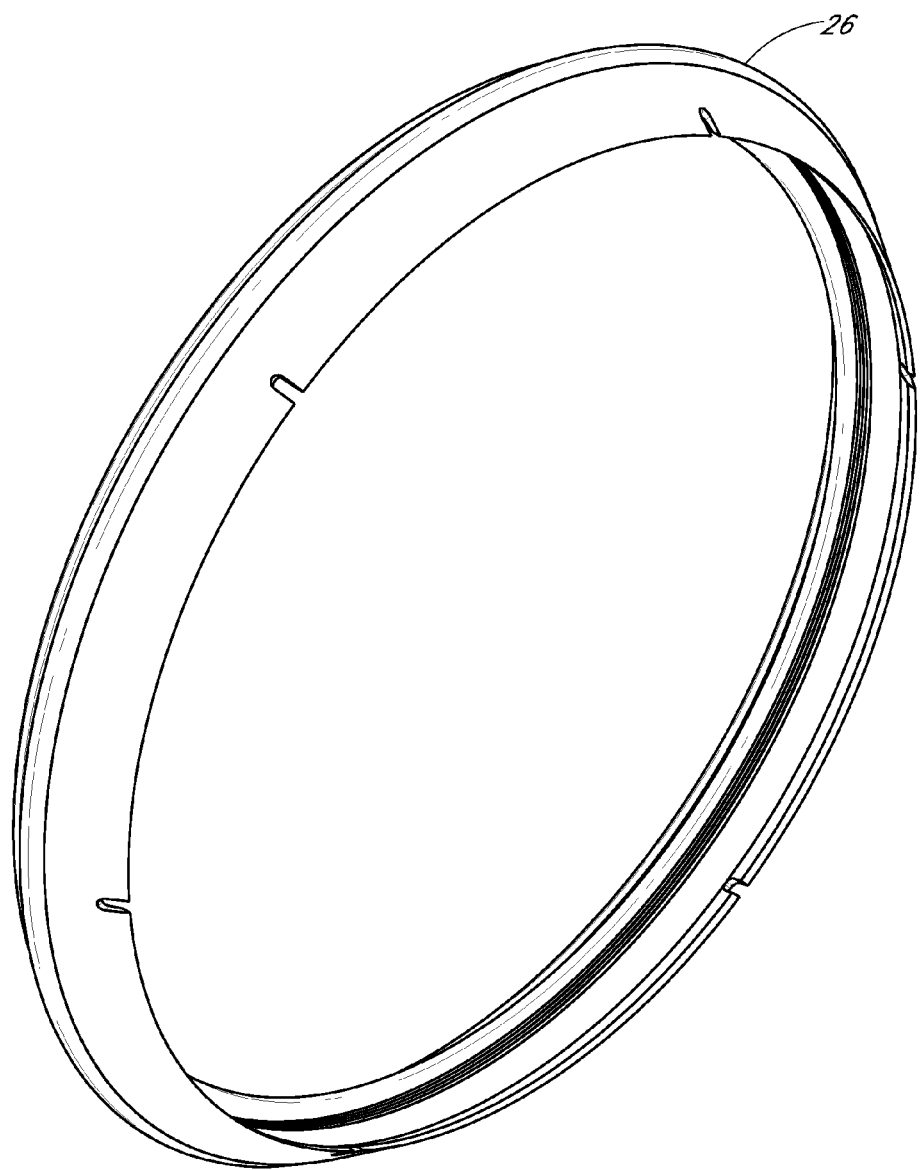
FIG. 5 is a perspective view of the sealing ring from FIG. 3.

FIG. 3 is an exploded cross-sectional view of the pipe coupling and sealing ring 26 from FIG. 2. FIG. 4 is a cross-section view of the sealing ring 26 from FIG. 3. FIG. 5 is a perspective view of the sealing ring 26 from FIG. 3. The sealing ring 26 comprises a sealing portion 42. In certain embodiments, the sealing portion 42 comprises an elastomeric material, for example, rubber. The sealing ring 26 further comprises a reinforcing portion 40. In certain embodiments, the reinforcing portion 40 comprises a polymeric material, for example, a relatively rigid plastic material. The sealing portion 42 and the reinforcing portion 40 are firmly connected together at a connection surface 44. The connection surface 44 can have a straight, curved, zigzag, or other cross-sectional shape. In order to improve the binding between the sealing portion 42 and the reinforcing portion 40 the connection surface 44 can be provided with recesses.

At its outer periphery the sealing portion 42 has an outer region 46. The outer region 46 has a smooth arcuate shape and projects outside the connection surface 44. The outer region 46 is connected to a forward region 48 of the sealing ring 26 by a concave curved region 50. At its inner periphery the sealing portion 42 has a protrusion 52 positioned radially inside the connection surface 44. In certain embodiments, the protrusion 52 is disposed so that when the protrusion 52 is compressed against the pipe, the protrusion 52 is in-line with the outer region 46. Thus, the sealing portion 42 can be considered to be defined by the outer region 46 and the protrusion 52, the connection surface 44 and a plane coincident with vertical line 54 of FIG. 4. When utilizing the sealing function of the sealing ring 26, the sealing portion 42 is subjected to a radial compression.

In certain embodiments, the protrusion 52 tapers back towards the reinforcing portion 40. This taper can generally follow a straight or arcuate path on one or both sides of the protrusion 52. In the illustrated embodiment, both sides of the protrusion 52 are tapered in a direction towards the reinforcing portion 40. The protrusion 52 can be advantageously sized and configured to cooperate with the outer surface of the male pipe 20 to form a seal with the inner surface of the female pipe 22. In certain embodiments, the compression of the protrusion 52 may inhibit relative longitudinal movement between the male and female pipes 20, 22.

The sealing portion 42 includes the forward region 48. The forward region 48 is a unitary part of the sealing portion 42 and positioned at the opposite side of the broken line 54 from the protrusion 52. In certain embodiments, at least a portion of the concave curved region 50 is coplanar with the protrusion 52. The concave curved region 50 formed between the forward region 48 and the bell groove 28 provides a gap for the sealing portion 42 to deform when the spigot end is inserted. The concave curved region 50 is also easier to follow during bell formation and assures improved contact between the pipe socket and the forward region 48 of the sealing ring 26. Even if the forward region 48 can contribute to the sealing function of the sealing ring 26, for example by acting as a sealing lip, the forward region 48 is not an active sealing portion of the sealing ring 26.

The sealing portion 42 comprises a rubber material, a thermoplastic elastomer (TPE), a thermoplastic vulcanisate (TPV or TPE-V), or other material selected for its sealing ability. In certain embodiments, the sealing portion 42 is formed of a generally homogeneous composition, such as from a suitable rubber or other elastomeric material. Suitable rubbers include natural or synthetic rubber such as a "SBR" commercial grade rubber. Elastomeric materials include EPDM or nitrile rubber. In certain embodiments, the sealing portion 42 comprises one or more ridges 56 for improving the sealing function.

The forward region 48 is joined to a sloped region 58. The sloped region 58 forms an alignment ramp to guide the mating spigot end during insertion and which defines an angle $\theta 1$ with respect to a horizontal axis 60 relative to the pipe. Exemplary values of angle $\theta 1$ include angles from 15 to 60 degrees. The specified range provides the advantage of forming an adequate seal with the pipe to avoid dirt and rocks from entering the seal. The sloped region 58 is joined to the ridges 56 by the protrusion 52. The protrusion 52 comprises a forward surface 62 which forms a contact surface which bends the protrusion 52 in a rearward direction when the mating spigot end contacts the forward surface 62 during insertion of the mating spigot. The forward surface 62 defines an angle $\theta 2$ with respect to the vertical line 54. Exemplary values of angle $\theta 2$ include angles from 30 to 60 degrees. The specified range provides the advantage of forming an adequate seal with the pipe. The specified range further provides the advantage of requiring a low insertion force factor when the pipes are assembled. For example, the chamfered surface 36 (FIG. 1) normally has a 15 degree chamfer.

The reinforcing portion 40 comprises a plastic polymer. Plastic polymers include polyethylene (PE), polypropylene (PP), acrylic, ABS, nylon, polybenzimidazole (PBI), polystyrene (PS), polyvinyl chloride (PVC), polytetrafluoroethylene (PTFE), thermoplastic vulcanite (TPV), thermoplastic elastomer (TPE), thermoplastic urethane (TPU) and styrene ethylene butylene styrene (SEBS). The reinforcing portion 40 is substantially wedge-shaped and forms at its side opposite from the connection surface 44 a relatively sharp side edge 64. Adjacent to the side edge 64 the reinforcing portion 40 forms an edge portion 66 of successively reduced inner diameters. In certain embodiments, the edge portion 66 is resiliently expandable to a position in which the inner surface of the edge portion 66 approaches a cylindrical shape. An outer shoulder 68 of the reinforcing portion 40 connects the edge portion 66 to the outer region 46 of the sealing portion 42. The outer shoulder 68 comprises a substantially conical surface having a knurled structure. The reinforcing portion 40 comprises a seal surface 70 which ends at the side edge 64. However, the seal surface 70, due to being formed from a thermoplastic material, may have limited sealing ability as compared to the forward surface 62 of the protrusion 52. In certain embodiments, the reinforcing portion 40 may be a fiber reinforced plastic. For example, the reinforcement fiber could be glass fiber, carbon fiber, or other fiber which reinforces the plastic.

The sealing ring 26 is installed within the groove 28 provided within the socket end 30 of the female pipe section 22. The sealing ring 26 has a low profile which allows insertion of the male, spigot pipe section 20 within the female, pipe section 22 with a minimum insertion force while maintaining the desired sealing characteristics of the pipe joint. The sealing ring 26 is useful in diverse sealing applications, including sewer pipe and other low pressure pipe. Particularly with respect to sewer pipe, problems of infiltration are encountered as opposed to problems of exfiltration of the type encountered with many high pressure applications. The sealing ring 26 provides the necessary sealing capacity for both sewer pipe and irrigation pipe applications.

Figure 6:
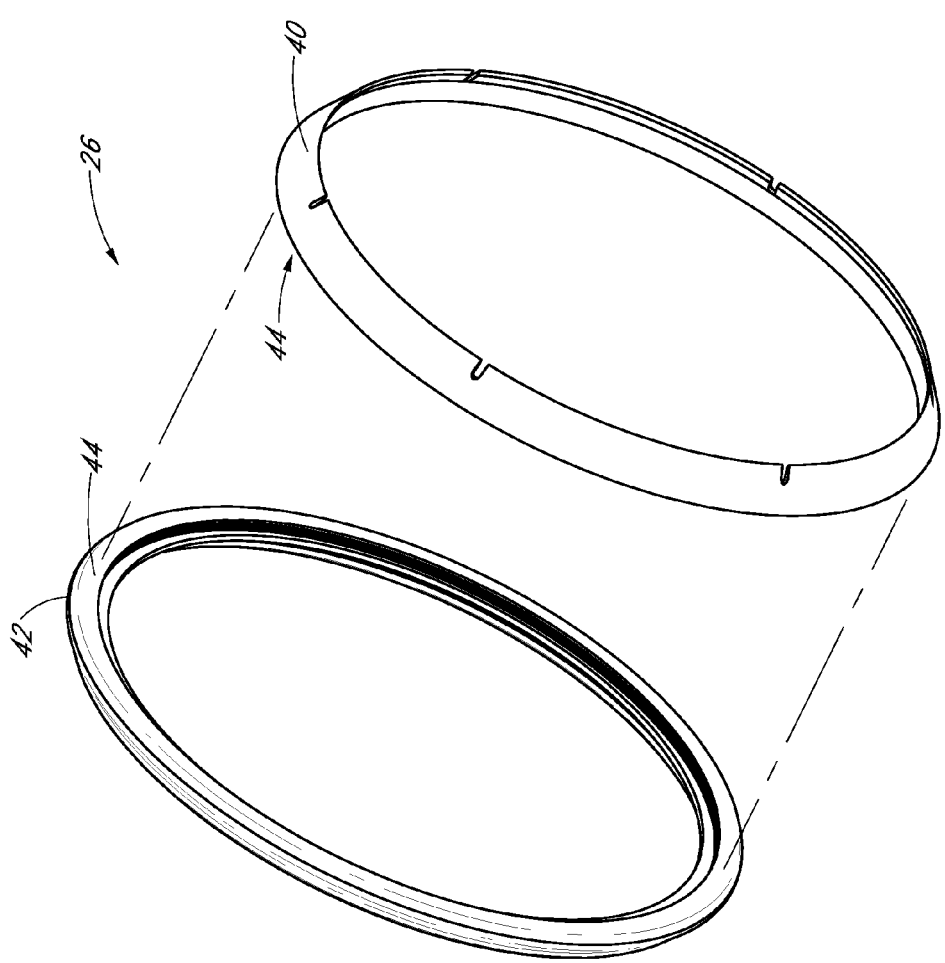
FIG. 6 is an exploded perspective view of the sealing ring from FIG. 5.

FIG. 6 is an exploded perspective view of the sealing ring 26 from FIG. 5 showing the sealing portion 42 separated from the reinforcing portion 40. The sealing portion 42 is joined to the reinforcing portion 40 at the connection surface 44 to define the sealing ring 26. As described above, each of the reinforcing portion 40 and the sealing portion 42 are separately homogenous but comprise different materials.

In certain embodiments, the sealing ring 26 is co-molded as a unitary structure. Alternatively, the sealing portion 42 and the reinforcing portion 40 are separately manufactured and assembled. For example, the sealing portion 42 can be joined to the reinforcing portion 40 to form the sealing ring 26. Depending on, for example, pipe geometry, materials, operating pressures, and loading, it may be preferred to increase or decrease the size of the connection surface 44. In the embodiment illustrated in FIG. 3, the sealing portion 42 and the reinforcing portion 40 are separate structures assembled together.

FIG. 7 is an end view of the sealing ring 26 from FIG. 5 taken on the reinforcing portion 40 side of the sealing ring 26. FIG. 8 is a side view of the sealing ring 26 from FIG. 5. FIG. 9 is an opposite end view to the view in FIG. 7 of the sealing ring 26 from FIG. 5 taken on the sealing portion 42 side of the sealing ring 26.

Figures 10, 11:
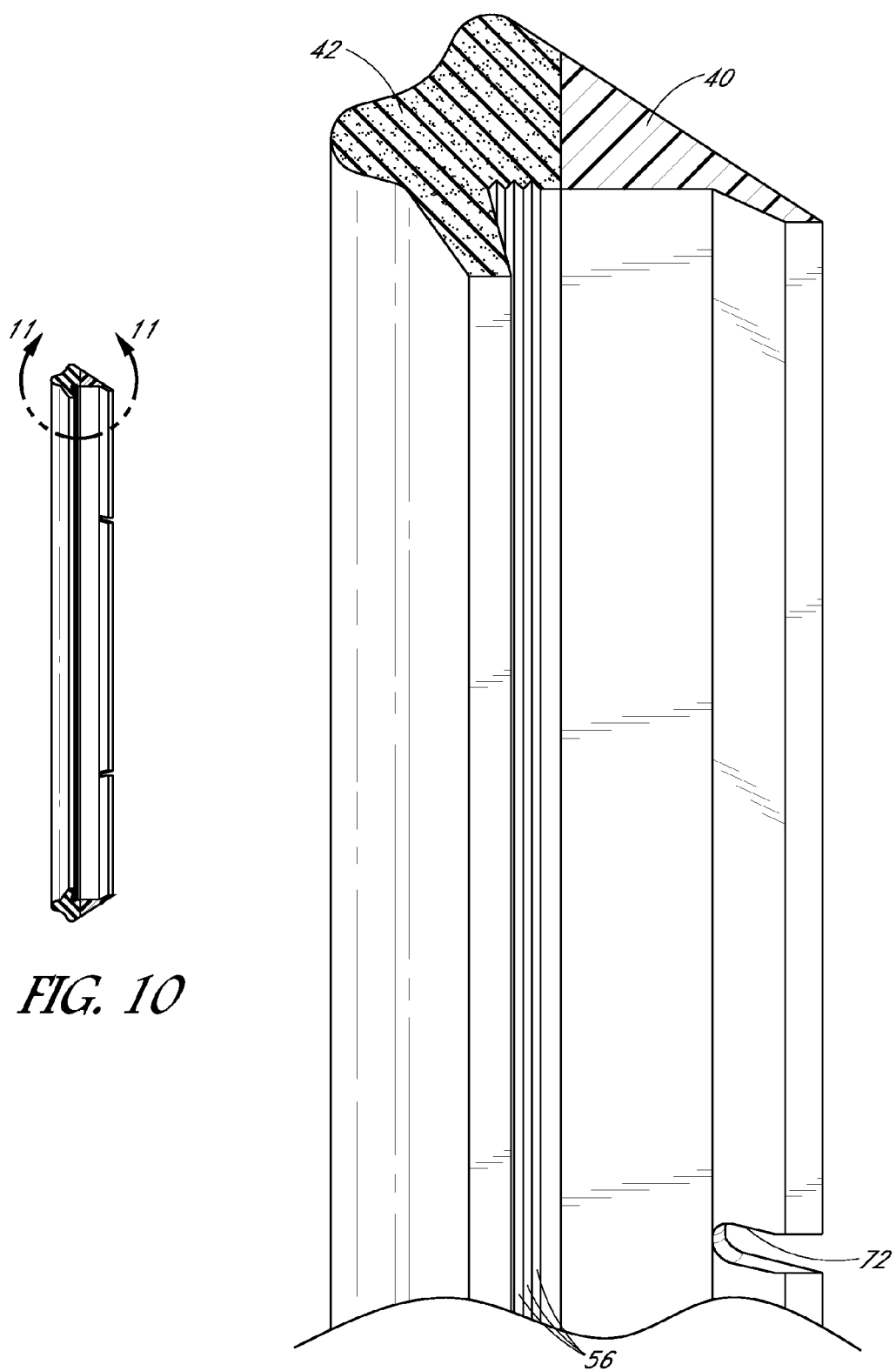
FIG. 10 is a cross-section view of the sealing ring from FIG. 5.
FIG. 11 is an enlarged view of the sealing ring taken at section 11-11 in FIG. 10.

FIG. 10 is a cross-section view of the sealing ring 26 from FIG. 5 illustrating an annular shape of sealing ring 26. FIG. 11 is an enlarged view of the sealing ring 26 taken at section 11-11 in FIG. 10. In certain embodiments, the sealing ring 26 includes the one or more grooves 56 extending along an inner surface of the sealing portion 42. The one or more grooves 56 extend along at least a portion of the inner circumference of the sealing portion 42. In certain embodiments, one or more of the grooves 56 extend about the entire inner circumference of the sealing portion 42. In embodiments which have a plurality of grooves 56, each groove 56 need not have the same circumferential length. Further, a groove 56 need not have the same radial clocking as another groove 56. For example, a first groove 56 can extend in a clockwise direction between 12 o'clock and 6 o'clock while a second groove 56 extends in a clockwise direction between 6 o'clock and 12 o'clock. In this way, the first groove 56 need not overlap the second groove 56. Alternatively, the first and second grooves 56 at least partially overlap or entirely overlap.

In certain embodiments, the side edge 64 is resiliently expandable to a position in which the inner surface of the side edge 64 approaches a cylindrical shape. One or more recesses 72 disposed about the periphery of the reinforcing portion 40 provide flexibility in the side edge 64. In certain embodiments, the recesses 72 in the side edge 64 are in the shape of one or more slots or other shapes. The recesses 72 may be spaced equally around the periphery of the reinforcing portion 40 or concentrated in one or more regions of the periphery.

As explained above, the sealing ring 26 is disposed around the outer circumference of a mandrel prior to installation into the female pipe 22. The surface of the mandrel may include ridges and/or grooves for preventing the sealing ring 26 from sliding along the longitudinal axis of the mandrel during insertion into the pipe 22. For example, the mandrel may include a shallow groove on the substantial cylindrical outer surface of the mandrel for receiving a portion of the sealing ring 26 during the insertion process. The portions of the groove may have different depths. The depths of the groove may be selected to allow the sealing portion 42 and the reinforcing portion 40 to engage the mandrel with different compression loads. For example, the portion of the groove which engages with the sealing portion 42 could be shaped so that the seal surface 70 of the side edge 64 is highly compressed against the mandrel during the forming process. In this way, the sharp side edge 64 closely engages the outer surface of the mandrel. In embodiments of the mandrel that include a rigid abutment the tendency for the sealing ring 26 to slide on the surface of the mandrel is diminished. The knurled structure of the mandrel also facilitates the sliding of the female pipe 22 along the surface of the mandrel.

During the belling and insertion process, the female pipe 22 is pushed over the sealing ring 26 when disposed on the mandrel. The shoulder 68 of the reinforcing portion 40 forms the final shape of the belled end 24 of the female pipe 22. In certain embodiments, a region of the mandrel includes an increasing outer diameter which initiates the forming of the belled end 24 of the female pipe 22 prior to the female pipe 22 sliding over the shoulder 68 of the reinforcing portion 40.

FIG. 12 is a cross-section view of the belled end of the female pipe 22 with the sealing ring 26 disposed therein. The sealing ring 26 forms the bell groove 28 in the socket end 30 of the female pipe 22 after the withdrawal of the mandrel 26 from the female pipe 22. In certain embodiments, the sealing ring 26 and the softened belled end 24 of the female pipe 22 are cooled after the belling and insertion process.

FIG. 13 is a cross-section view of the assembled joint from FIG. 2 showing both the spigot end of the male pipe 20 and the belled end 24 of the female pipe 22 with the sealing ring 26 compressed between the outer surface of the spigot and the inner surface of the belled end 24. The sealing portion 42 is compressed between the inner surface of the groove 28 formed in the female pipe 22 and the outer surface of the spigot end of the male pipe 20 introduced into the socket. The sealing portion 42 forms a lip seal engaging the outer surface of the male pipe 20. The reinforcing portion 40 need not provide a sealing function. However, the reinforcing portion 40 contributes to the stability of the joint by the side edge 64 engaging the outer surface of the male pipe 20.

Figure 14:
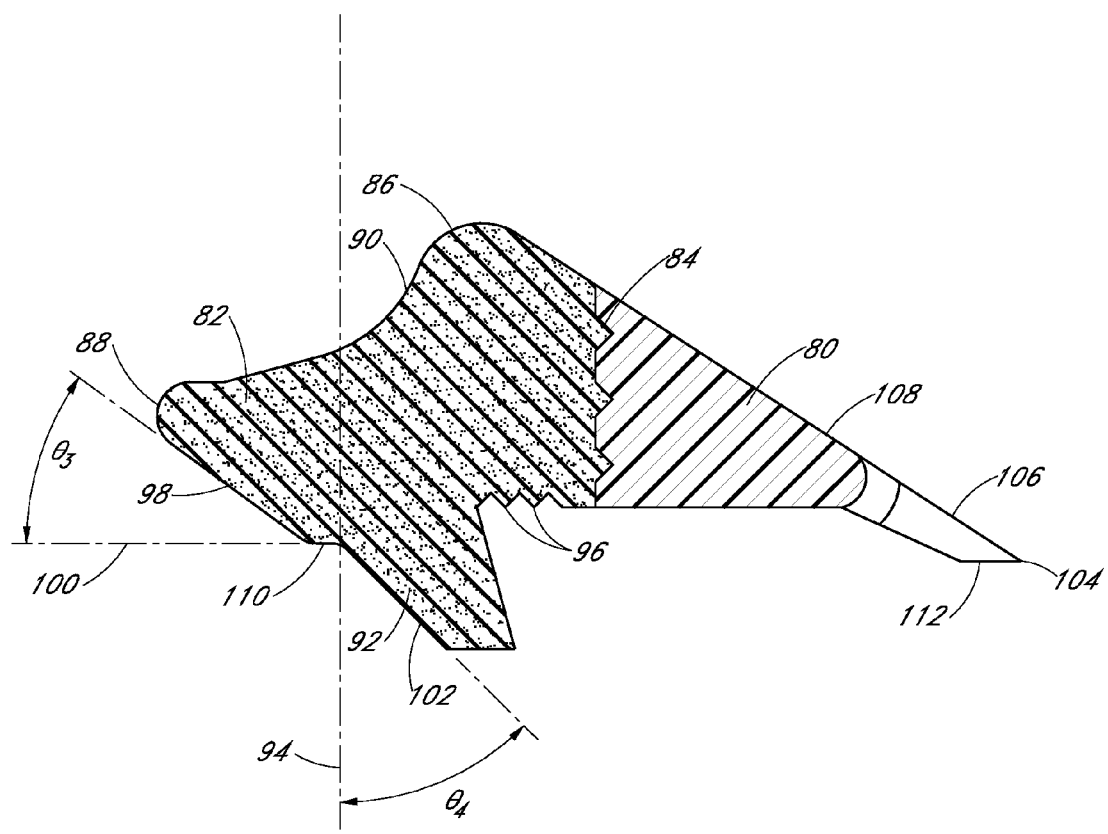
FIG. 14 is a cross-section view of another embodiment of a sealing ring for use in the system of FIG. 2.

FIG. 14 is a cross-section view of another embodiment of a sealing ring 27 for use in the system of FIG. 2. The sealing ring 27 is similar to the sealing ring 26 described with respect to FIGS. 4-11 except that the sealing ring 27 is intended for use in non-pressurized applications. The sealing ring 26 is primarily intended for use in pressurized applications. Accordingly, the cross-sections of the sealing rings 26, 27 are different and include different features.

Figure 15:
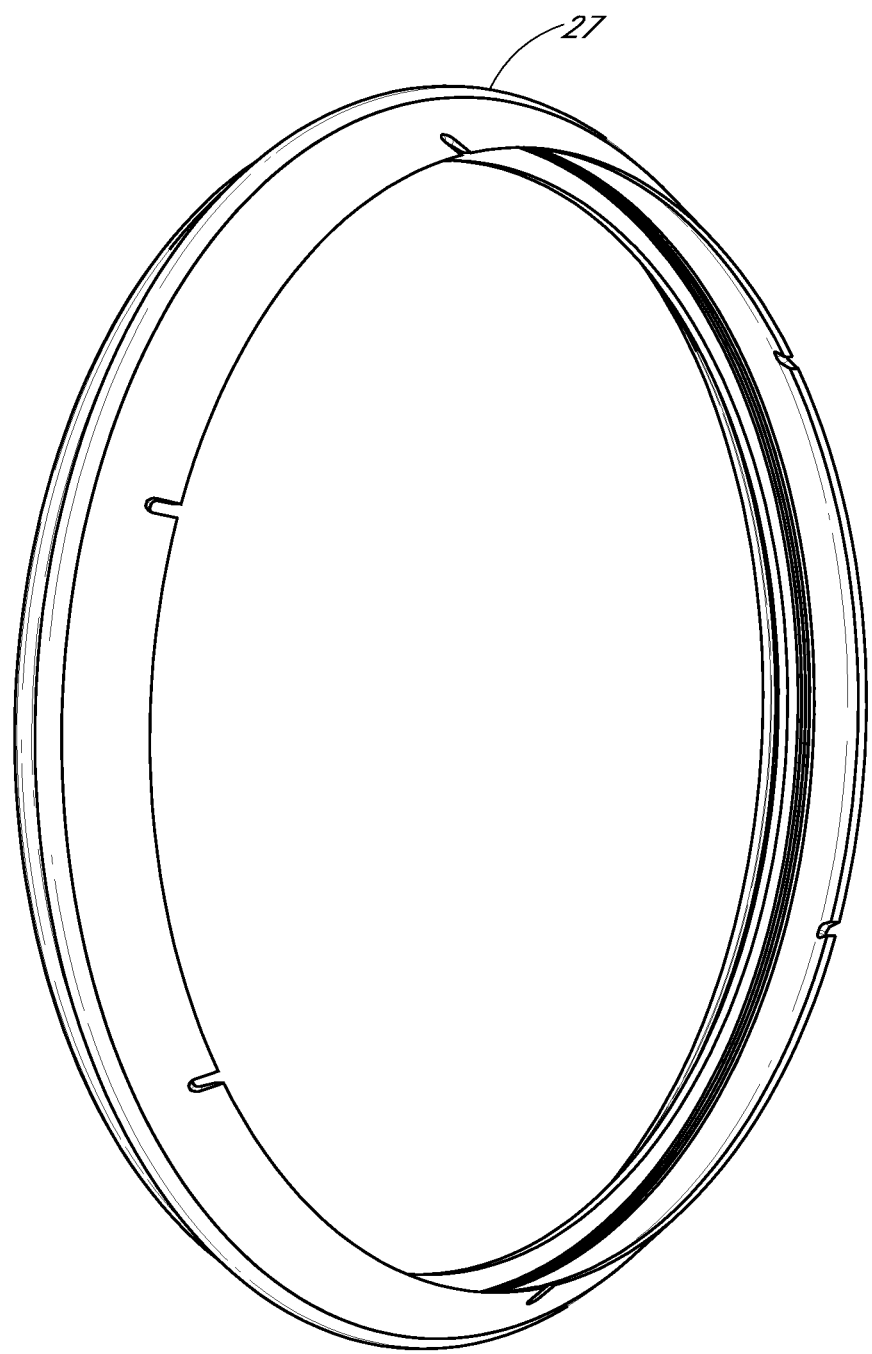
FIG. 15 is a perspective view of the sealing ring from FIG. 14.

FIG. 15 is a perspective view of the sealing ring 27 from FIG. 14. The sealing ring 27 comprises a sealing portion 82. In certain embodiments, the sealing portion 82 comprises an elastomeric material, for example, rubber. The sealing ring 27 further comprises a reinforcing portion 80. In certain embodiments, the reinforcing portion 80 comprises a polymeric material, for example, a relatively rigid plastic material. The sealing portion 82 and the reinforcing portion 80 are firmly connected together at a connection surface 84. The connection surface 84 can have a straight, curved, zigzag, or other cross-sectional shape. In order to improve the binding between the sealing portion 82 and the reinforcing portion 80 the connection surface 84 is provided with recesses.

At its outer periphery the sealing portion 82 has an outer region 86. The outer region 86 has a smooth arcuate shape and projects outside the connection surface 84. The outer region 86 is connected to a forward region 88 of the sealing ring 27 by a concave curved region 90. At its inner periphery the sealing portion 82 has a protrusion 92 positioned radially inside the connection surface 84. In certain embodiments, the protrusion 92 is disposed so that when the protrusion 92 is compressed against the pipe, the protrusion 92 is in-line with the outer region 86. Thus, the sealing portion 82 can be considered to be defined by the outer region 86 and the protrusion 92, the connection surface 84 and a plane coincident with vertical line 94 of FIG. 14. When utilizing the sealing function of the sealing ring 27, the sealing portion 82 is subjected to a radial compression.

In certain embodiments, the protrusion 92 tapers back towards the reinforcing portion 80. This taper can generally follow a straight or arcuate path on one or both sides of the protrusion 92. In the illustrated embodiment, both sides of the protrusion 92 are tapered in a direction towards the reinforcing portion 80. The protrusion 92 can be advantageously sized and configured to cooperate with the outer surface of the male pipe 20 to form a seal with the inner surface of the female pipe 22. In certain embodiments, the compression of the protrusion 92 may inhibit relative longitudinal movement between the male and female pipes 20, 22.

The sealing portion 82 includes the forward region 88. The forward region 88 is a unitary part of the sealing portion 82 and positioned at the opposite side of the broken line 94 from the protrusion 92. In certain embodiments, at least a portion of the concave curved region 90 is coplanar with the protrusion 92. The concave curved region 90 formed between the forward region 88 and the bell groove 28 provides a gap for the sealing portion 82 to deform when the spigot end is inserted. The concave curved region 90 is also easier to follow during bell formation and assures improved contact between the pipe socket and the forward region 88 of the sealing ring 27. Even if the forward region 88 can contribute to the sealing function of the sealing ring 27, for example by acting as a sealing lip, the forward region 88 is not an active sealing portion of the sealing ring 27.

The sealing portion 82 comprises the same materials as described above with respect to the sealing portion 42. In certain embodiments, the sealing portion 82 comprises one or more ridges 96 for improving the sealing function.

The forward region 88 is joined to a sloped region 98. The sloped region 98 forms an alignment ramp to guide the mating spigot end during insertion and which defines an angle θ3 with respect to a horizontal axis 100 relative to the pipe. Exemplary values of angle θ3 include angles from 15 to 60 degrees. The specified range provides the advantage of forming an adequate seal with the pipe to avoid dirt and rocks from entering the seal. A surface 110 is disposed adjacent to the sloped region 98. In certain embodiments, the surface 110 is generally planar and angled in an upward direction. In certain embodiments, the surface 110 is disposed at an angle from 0.1 to 5 degrees above the horizontal axis 100. The positive angle provided by the surface 110 provides the advantage of reducing friction during insertion into the mandrel. The sloped region 98 is joined to the ridges 96 by the protrusion 92. The protrusion 92 comprises a forward surface 102 which forms a contact surface which bends the protrusion 92 in a rearward direction when the mating spigot end contacts the forward surface 102 during insertion of the mating spigot. The forward surface 102 defines an angle θ4 with respect to the vertical line 94. Exemplary values of angle θ4 include angles from 30 to 60 degrees. The specified range provides the advantage of forming an adequate seal with the pipe. The specified range further provides the advantage of requiring a low insertion force factor when the pipes are assembled. For example, the chamfered surface 36 (FIG. 1) normally has a 15 degree chamfer.

The reinforcing portion 80 comprises the same materials as described above with respect to the reinforcing portion 40. The reinforcing portion 80 is substantially wedge-shaped and forms at its side opposite from the connection surface 84 a relatively sharp side edge 104. Adjacent to the side edge 104 the reinforcing portion 80 forms an edge portion 106 of successively reduced inner diameters. In certain embodiments, the edge portion 106 is resiliently expandable to a position in which the inner surface of the edge portion 106 approaches a cylindrical shape. An outer shoulder 108 of the reinforcing portion 80 connects the edge portion 106 to the outer region 86 of the sealing portion 82. The outer shoulder 108 comprises a substantially conical surface having a knurled structure. The reinforcing portion 80 comprises a seal surface 112 which ends at the side edge 104. However, the seal surface 112, due to being formed from a thermoplastic material, may have limited sealing ability as compared to the forward surface 102 of the protrusion 92. In certain embodiments, the reinforcing portion 80 may be a fiber reinforced plastic. For example, the reinforcement fiber could be glass fiber, carbon fiber, or other fiber which reinforces the plastic.

The sealing ring 27 is installed within the groove 28 provided within the socket end 30 of the female pipe section 22. The sealing ring 27 has a low profile which allows insertion of the male, spigot pipe section 20 within the female, pipe section 22 with a minimum insertion force while maintaining the desired sealing characteristics of the pipe joint. The sealing ring 27 is useful in diverse sealing applications, including sewer pipe and other low pressure pipe. Particularly with respect to sewer pipe, problems of infiltration are encountered as opposed to problems of exfiltration of the type encountered with many high pressure applications. The sealing ring 27 provides the necessary sealing capacity for both sewer pipe and irrigation pipe applications.

Figure 16:
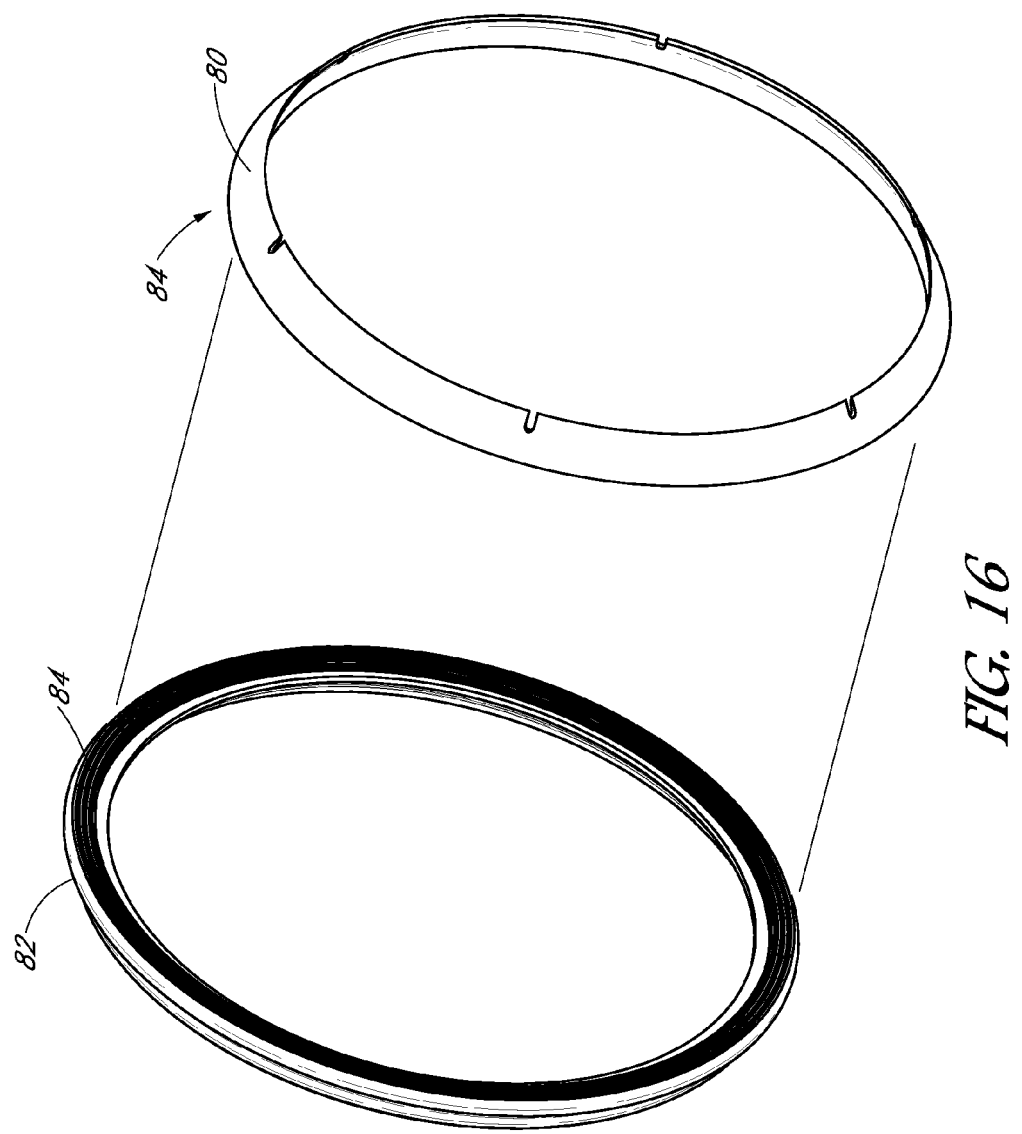
FIG. 16 is an exploded perspective view of the sealing ring from FIG. 15.

FIG. 16 is an exploded perspective view of the sealing ring 27 from FIG. 15 showing the sealing portion 82 separated from the reinforcing portion 80. The sealing portion 82 is joined to the reinforcing portion 80 at the connection surface 84 to define the sealing ring 27. As described above, each of the reinforcing portion 80 and the sealing portion 82 are separately homogenous but comprise different materials.

In certain embodiments, the sealing ring 27 is co-molded as a unitary structure. Alternatively, the sealing portion 82 and the reinforcing portion 80 are separately manufactured and assembled. For example, the sealing portion 82 can be joined to the reinforcing portion 80 to form the sealing ring 27. Depending on, for example, pipe geometry, materials, operating pressures, and loading, it may be preferred to increase or decrease the size of the connection surface 84. In the embodiment illustrated in FIG. 14, the sealing portion 82 and the reinforcing portion 80 are separate structures assembled together.

Figures 17, 18:
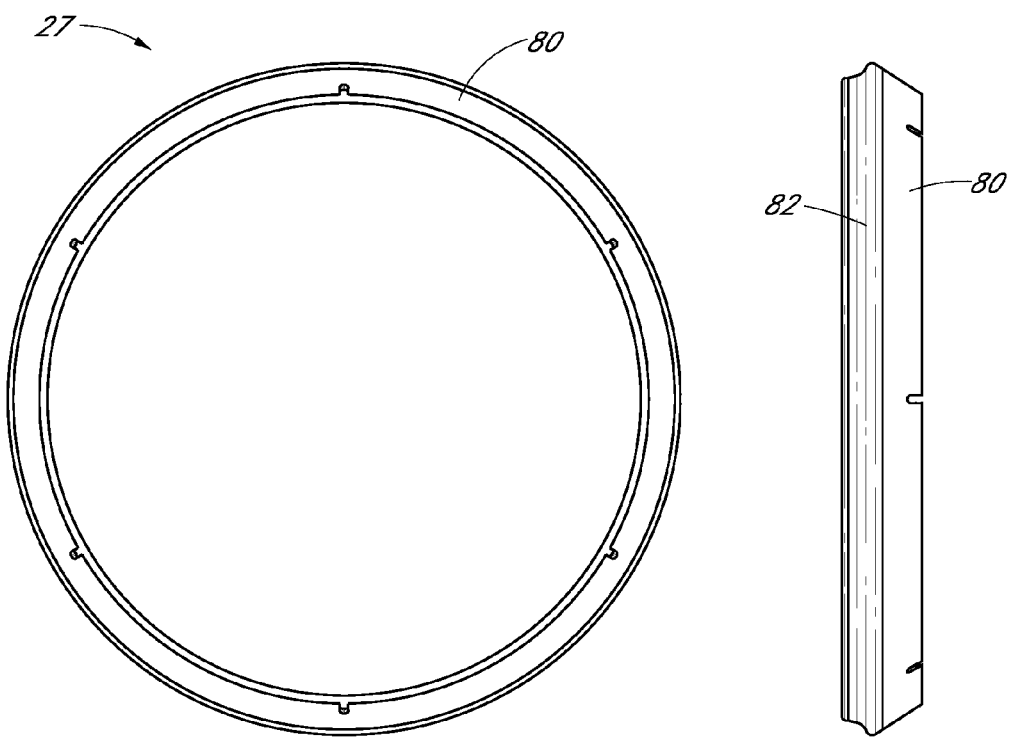
FIG. 17 is an end view of the sealing ring from FIG. 15.
FIG. 18 is a side view of the sealing ring from FIG. 15.
Figure 19:
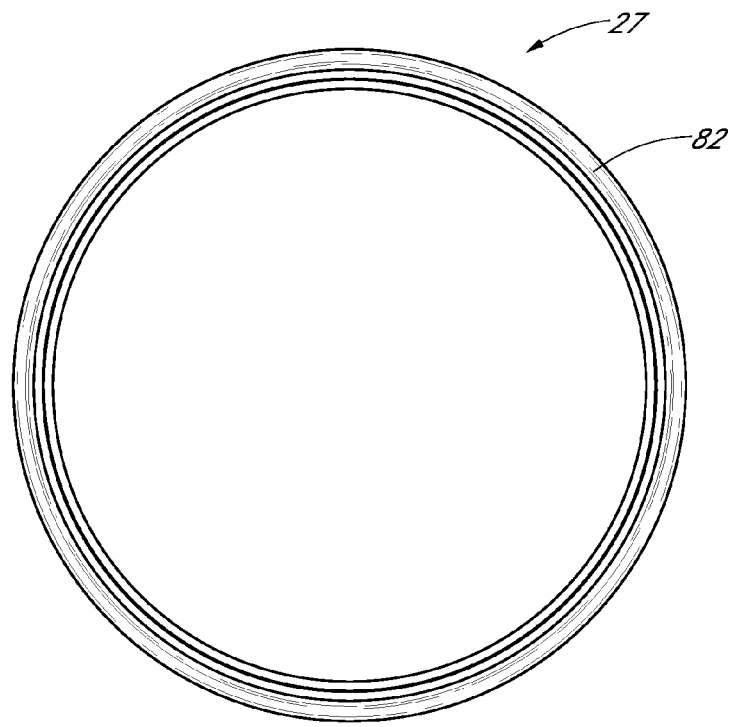
FIG. 19 is an opposite end view to the view in FIG. 17 of the sealing ring from FIG. 15.

FIG. 17 is an end view of the sealing ring 27 from FIG. 15 taken on the reinforcing portion 80 side of the sealing ring 27. FIG. 18 is a side view of the sealing ring 27 from FIG. 15. FIG. 19 is an opposite end view to the view in FIG. 17 of the sealing ring 27 from FIG. 15 taken on the sealing portion 82 side of the sealing ring 27.

Figure 20:
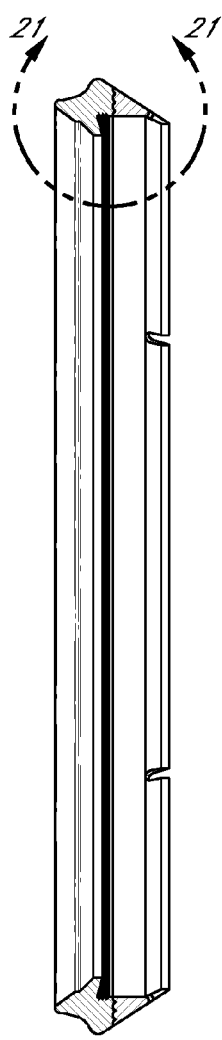
FIG. 20 is a cross-section view of the sealing ring from FIG. 15.
Figure 21:
FIG. 21 is an enlarged view of the sealing ring taken at section 21-21 in FIG. 20.

FIG. 20 is a cross-section view of the sealing ring 27 from FIG. 15 illustrating an annular shape of sealing ring 27. FIG. 21 is an enlarged view of the sealing ring 27 taken at section 21-21 in FIG. 20. In certain embodiments, the sealing ring 27 includes the one or more grooves 96 extending along an inner surface of the sealing portion 82. The one or more grooves 96 extend along at least a portion of the inner circumference of the sealing portion 82. In certain embodiments, one or more of the grooves 96 extend about the entire inner circumference of the sealing portion 82. In embodiments which have a plurality of grooves 96, each groove 96 need not have the same circumferential length. Further, a groove 96 need not have the same radial clocking as another groove 96. For example, a first groove 96 can extend in a clockwise direction between 12 o'clock and 6 o'clock while a second groove 96 extends in a clockwise direction between 6 o'clock and 12 o'clock. In this way, the first groove 96 need not overlap the second groove 96. Alternatively, the first and second grooves 96 at least partially overlap or entirely overlap.

In certain embodiments, the side edge 104 is resiliently expandable to a position in which the inner surface of the side edge 104 approaches a cylindrical shape. One or more recesses 114 disposed about the periphery of the reinforcing portion 80 provide flexibility in the side edge 104. In certain embodiments, the recesses 114 in the side edge 104 are in the shape of one or more slots or other shapes. The recesses 114 may be spaced equally around the periphery of the reinforcing portion 80 or concentrated in one or more regions of the periphery.

As explained above, the sealing ring 27 is disposed around the outer circumference of a mandrel prior to installation into the female pipe 22. The surface of the mandrel may include ridges and/or grooves for preventing the sealing ring 27 from sliding along the longitudinal axis of the mandrel during insertion into the pipe 22. For example, the mandrel may include a shallow groove on the substantial cylindrical outer surface of the mandrel for receiving a portion of the sealing ring 27 during the insertion process. The portions of the groove may have different depths. The depths of the groove may be selected to allow the sealing portion 82 and the reinforcing portion 80 to engage the mandrel with different compression loads. For example, the portion of the groove which engages with the sealing portion 82 could be shaped so that the seal surface 112 of the side edge 104 is highly compressed against the mandrel during the forming process. In this way, the sharp side edge 104 closely engages the outer surface of the mandrel. In embodiments of the mandrel that include a rigid abutment the tendency for the sealing ring 27 to slide on the surface of the mandrel is diminished. The knurled structure of the mandrel also facilitates the sliding of the female pipe 22 along the surface of the mandrel.

During the belling and insertion process, the female pipe 22 is pushed over the sealing ring 27 when disposed on the mandrel. The shoulder 108 of the reinforcing portion 80 forms the final shape of the belled end 24 of the female pipe 22. In certain embodiments, a region of the mandrel includes an increasing outer diameter which initiates the forming of the belled end 24 of the female pipe 22 prior to the female pipe 22 sliding over the shoulder 108 of the reinforcing portion 80.

Embodiments of the sealing rings 26, 27 disclosed herein provide several advantages over the Rieber seal. By having a portion of the sealing ring 26, 27 be made from plastic, the friction between the entire sealing ring 26, 27 and the female pipe 22 and mandrel is reduced. Reducing the friction between these surfaces saves energy and reduces scrap as compared to an entirely rubber seal. By reducing the amount of rubber in the sealing ring, the sealing ring absorbs less heat which allows faster cooling after insertion as well as reducing the level of scrap where the pipe is thin and more susceptible to collapsing during the belling process. In addition, without a metal wire or band in the sealing ring 26, 27 the risk of contamination due to corrosion of the metal wire or band is obviated. Prior art seals which include a metal band may comprise chemicals solutions to mitigate corrosion of the metal wire or band. However, the chemical solutions themselves can contaminate soil. Further, the metal wire or band makes it difficult to remove a dislodged or twisted seal after installation in the female pipe 22. The changes to the Rieber seal geometry and composition disclosed herein do not require dramatic changes in the required manufacturing tooling, allowing the sealing ring 26, 27 to be employed with existing machines being used by pipe producers while achieving substantially improved field performance.

The information in the disclosure and description of the invention itself are illustrative only of the application of the principles of the present invention. Other modifications and alternative embodiments may be devised by those skilled in the art without departing from the spirit and scope of the present invention.

Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Furthermore, the skilled artisan will recognize the interchangeability of different embodiments. For example, various sealing rings disclosed herein, as well as other known equivalents for each such feature, can be mixed and matched by one of ordinary skill in this art to construct sealing rings in accordance with principles of the present invention.

Although this invention has been disclosed in the context of certain preferred embodiments and examples, it therefore will be understood by those skilled in the art that the present invention extends beyond the specifically disclosed embodiments to other alternative embodiments and/or uses of the invention and obvious modifications and equivalents thereof. Thus, it is intended that the scope of the present invention herein disclosed should not be limited by the particular disclosed embodiments described above, but should be determined only by a fair reading of the claims.

What is claimed is:

1. An improved Rieber type sealing ring comprising:
   a homogeneous annular sealing portion comprising an elastically yieldable material and having a concave curved region extending inward and disposed so as to contact an inner surface of a female pipe section when a male pipe section is installed therein, a sloped region, and an inner protrusion having a forward surface joined to the sloped region, the concave curved region extending further forward than the inner protrusion, the sloped region being at an angle from 15 to 60 degrees relative to a horizontal axis so as to form an alignment ramp to guide the male pipe section during insertion into the female pipe section; and
   a homogenous annular reinforcing portion joined to the homogeneous annular sealing portion and comprising a thermoplastic.

2. The sealing ring of claim 1, wherein the sealing portion comprises rubber.

3. The sealing ring of claim 1, wherein the sealing portion comprises a thermoplastic elastomer (TPE).

4. The sealing ring of claim 1, wherein the reinforcing portion is positioned axially adjacent to the sealing portion.

5. The sealing ring of claim 1, wherein the reinforcing portion has a cross sectional profile of less radial extension than a cross sectional profile of the sealing portion.

6. The sealing ring of claim 1, wherein the reinforcing portion has a radially resilient wedge-shaped edge portion.

7. The seal of claim 1, wherein the sealing portion has an outer region, and wherein the inner protrusion is coplanar with the outer region.

8. The sealing ring of claim 7, wherein at least a portion of the concave curved region is coplanar with the inner protrusion.

9. The sealing ring of claim 1, wherein the reinforcing portion comprises polypropylene (PP).

10. The sealing ring of claim 1, wherein the sealing portion comprises one or more grooves disposed on an inside surface of the sealing portion.

11. The sealing ring of claim 1, wherein the forward surface is configured to contact the male pipe section.

12. The sealing ring of claim 11, wherein the forward surface is at an angle from 30 to 60 degrees relative to a vertical axis.

13. An annular seal for installation within a receiving end of a first pipe section and within which an inserting end of a second pipe section is subsequently installed, the seal comprising:
   a body including an elastomeric portion joined to a polymer portion, the elastomeric portion having a forward region, an outer region connected by a concave curved region to the forward region, a sloped region, and an inner protrusion having a forward surface joined to the sloped region, the concave curved region extending inward, and the inner protrusion being coplanar in a vertical direction with the concave curved region, the concave curved region extending further forward than the inner protrusion, the sloped region being at an angle from 15 to 60 degrees relative to a horizontal axis so as to form an alignment ramp to guide the second pipe section during insertion into the first pipe section.

14. The seal of claim 13, wherein the elastomeric portion comprises an elastically yieldable material.

15. The seal of claim 13, wherein the polymer portion is positioned axially adjacent to the elastomeric portion.

16. The seal of claim 13, wherein the elastomeric portion abuts the polymer portion.

17. The seal of claim 13, wherein the polymer portion has a cross sectional profile of less radial extension than a cross sectional profile of the elastomeric portion.

18. The seal of claim 13, wherein the polymer portion has a radially resilient wedge-shaped edge portion.

19. The seal of claim 13, wherein the elastomeric portion has an outer region and the inner protrusion is coplanar with the outer region.

20. The seal of claim 13, wherein the polymer portion comprises polypropylene (PP).

21. The seal of claim 13, wherein the forward surface is configured to contact the inserting end of the second pipe section.

22. The seal of claim 21, wherein the forward surface is at an angle from 30 to 60 degrees relative to a vertical axis.

23. A method of installing an improved Rieber seal in a belled pipe, the method comprising:
   providing a homogeneous annular sealing portion comprising elastomeric material and a homogenous annular reinforcing portion comprising a polymeric material joined to the homogeneous annular sealing portion, the homogenous annular sealing portion having a concave curved region extending inward and disposed so as to contact an inner surface of a female pipe section when a male pipe section is installed therein, a sloped region, and an inner protrusion having a forward surface joined to the sloped region, the concave curved region extending further forward than the inner protrusion, the sloped region being at an angle from 15 to 60 degrees relative to a horizontal axis so as to form an alignment ramp to guide the male pipe section during insertion into the female pipe section; and
   locating the homogeneous annular sealing portion and the homogenous annular reinforcing portion in the female pipe section.

24. The method of claim 23, further comprising forming a belled portion of the female pipe section.

25. The method of claim 24, wherein the forming of the belled portion and the providing of the sealing portion in the female pipe section is performed at the same time.

* * * * *